July 29, 1958     L. N. RAPP     2,844,916
PLANT SUPPORTING VASE
Filed May 18, 1956     3 Sheets-Sheet 1
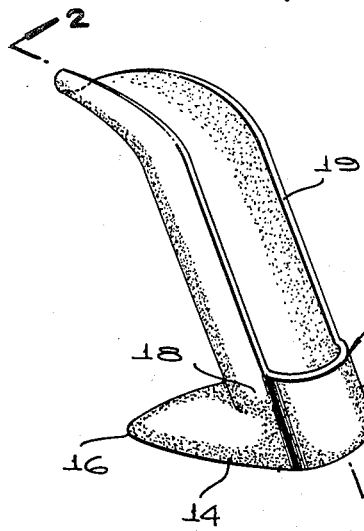
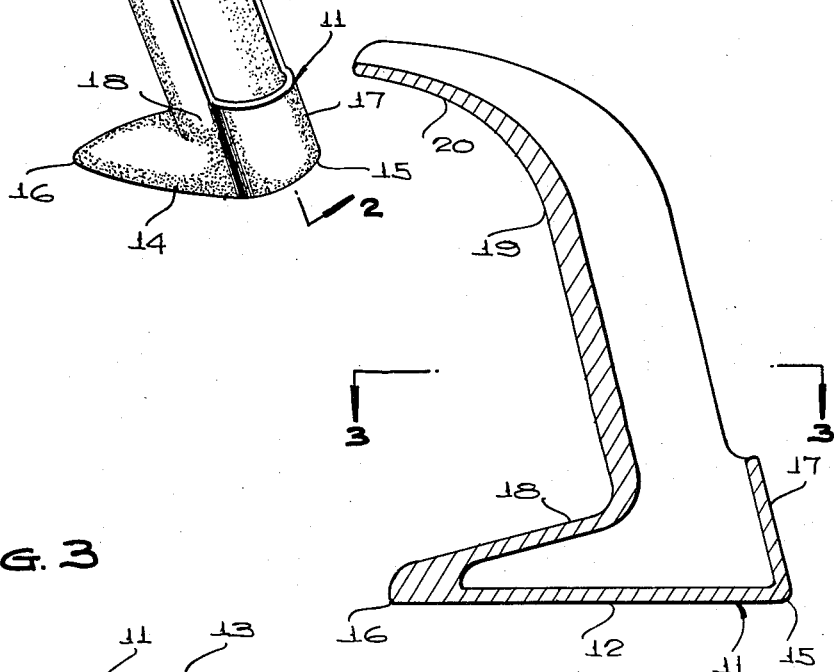
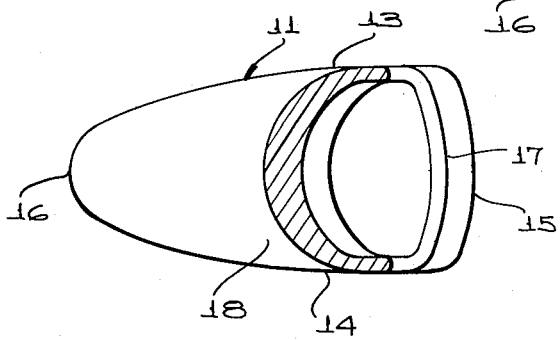
INVENTOR.
LAWRENCE N. RAPP
BY
McMorrow, Berman + Davidson
ATTORNEYS July 29, 1958 — L. N. RAPP — 2,844,916
PLANT SUPPORTING VASE
Filed May 18, 1956 — 3 Sheets-Sheet 2
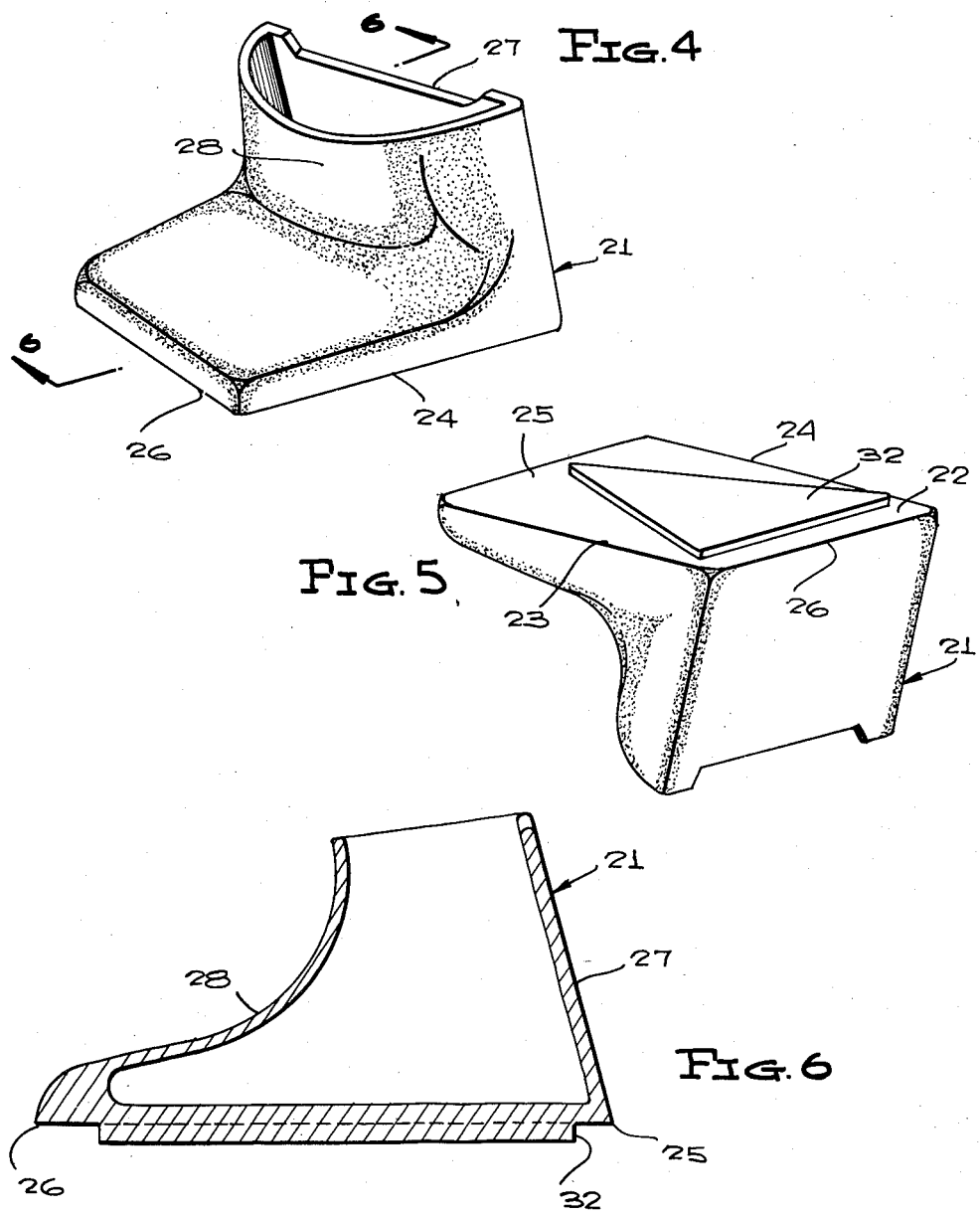
INVENTOR.
LAWRENCE N. RAPP
BY
McMorrow, Berman & Davidson
ATTORNEYS July 29, 1958　　　　L. N. RAPP　　　　2,844,916
PLANT SUPPORTING VASE
Filed May 18, 1956　　　　　　　　　　3 Sheets-Sheet 3
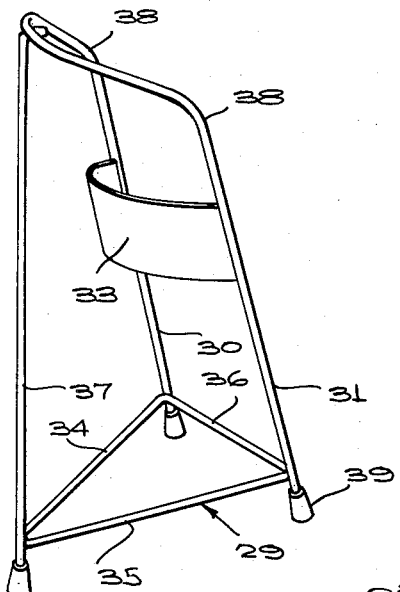
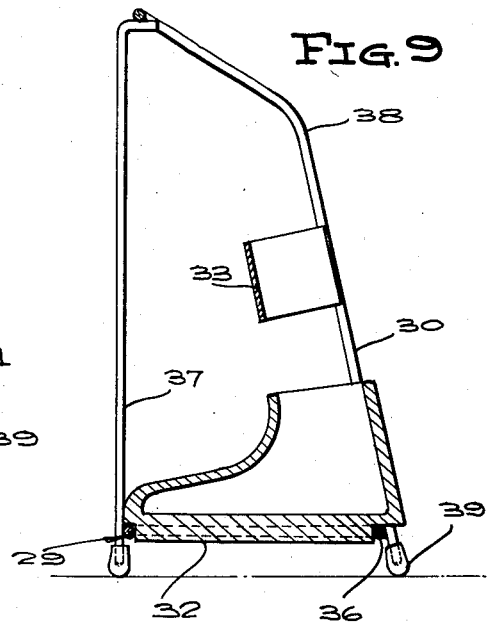
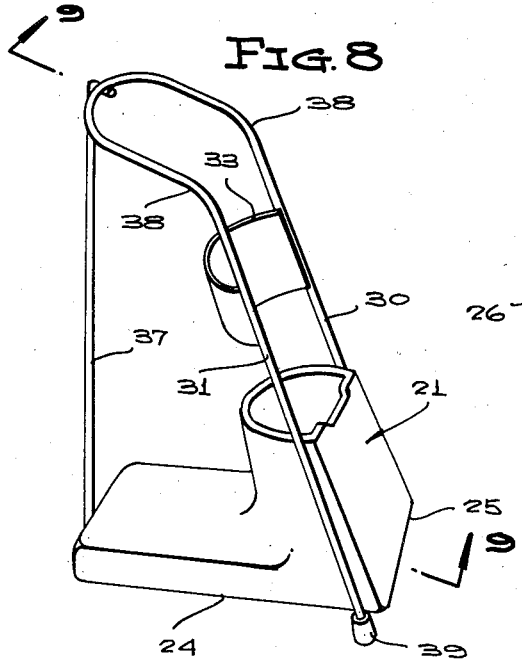
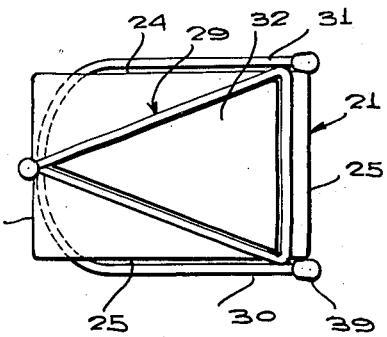
*INVENTOR.*
LAWRENCE N. RAPP
BY
ATTORNEYS

United States Patent Office 2,844,916
Patented July 29, 1958

2,844,916
PLANT SUPPORTING VASE
Lawrence N. Rapp, Morton, Ill.

Application May 18, 1956, Serial No. 585,721

2 Claims. (Cl. 47—41)

The present invention relates to a plant-retaining and supporting vase.

An object of the present invention is to provide a vase for a plant and one having means for supporting the stems, foliage, and flowers of the plant in arranged floral designs, and one which provides increased visibility of the floral or plant arrangements supported therein.

Another object of the present invention is to provide a vase for a plant for displaying the foliage and flowers of the plant and one which is attractive in appearance, relatively compact in size, and one which holds water and plant food for the plant to sustain the life of the plant, and one which is inexpensive to manufacture.

These and other objects and advantages of the present invention will be fully apparent from the following description when taken in connection with the annexed drawings, in which:

Figure 1 is a perspective view of the vase of the present invention,

Figure 2 is a sectional view, on an enlarged scale, taken on the line 2—2 of Figure 1, Figure 3 is a sectional view taken on the line 3—3 of Figure 2, Figure 4 is a perspective view of the receptacle portion of another form of the vase of the present invention, Figure 5 is a perspective view of the receptacle of Figure 4, in inverted position, Figure 6 is a sectional view, on an enlarged scale, taken on the line 6—6 of Figure 4, Figure 7 is a perspective view of the support portion of the second form of the vase of the present invention, Figure 8 is a perspective view of the receptacle portion of Figures 4 to 6, inclusive, and the support portion of Figure 7, in assembled position, Figure 9 is a sectional view taken on the line 9—9 of Figure 8, and Figure 10 is a view of the assembly of Figure 8 in inverted position.

Referring in greater detail to the drawings in which like numerals indicate like parts throughout the several views, the plant-supporting vase of the present invention comprises, as shown in Figures 1 to 3, inclusive, a receptacle 11 having an open top and including a flat bottom 12 having spaced side edges 13 and 14, a front edge 15, and a rear edge 16. A straight wall 17 rises from the front edge 15 of the bottom 12 and slopes toward the rear edge 16 of the bottom 12.

An apron 18 rises from and extends about the rear edge 16 and the side edges 13 and 14 of the bottom 12 and is secured to the straight wall 17. The portion of the apron 18 which extends about the rear edge 16 of the bottom 12 is inwardly bowed.

A concavely curved trough 19 is positioned above the receptacle 11 so that its top faces toward the receptacle straight wall 17. The trough 19 extends from the top of the apron 18 and slopes in a direction complemental to the slope of the receptacle straight wall 17. The upper end portion 20 of the trough 19 tapers in width and terminates in a curved edge substantially in vertical alignment with the rear edge 16 of the bottom 12.

In a second form of the vase of the present invention, the receptacle portion 21, shown in Figures 4 to 6, inclusive, and in Figures 8 to 10, inclusive, has an open top, a flat bottom 22, spaced side edges 23 and 24, a front edge 25, and a rear edge 26. A straight wall 27 rises from the front edge 25 of the flat bottom 22 and slopes toward the rear edge 26 of the bottom 22. An apron 28 rises from and extends about the rear edge 26 of the bottom 22 and the side edges 23 and 24 of the bottom 22 and is secured to the straight wall 27. The portion of the apron 28 which extends about the rear edge 26 of the receptacle bottom 22 is inwardly bowed.

The support portion of the second form of the base of the present invention is shown in Figures 7 to 10, inclusive, and comprises a horizontally-disposed base 29 and a pair of laterally-spaced legs 30 and 31 rising from the base 29 and sloping toward the base 29.

As shown in Figures 5, 6, 9, and 10, the flat bottom 22 of the receptacle portion 21 has a mounting projection 32 thereon. The projection 32 is received in the base 29, each of them being triangular in section, the base 29 being open in form. When the receptacle portion 21 of the second form of the invention is positioned so that the projection 32 is received in the base 29, the straight wall 27 thereof is between the legs 30 and 31. A concavely-curved trough 33 is positioned above the receptacle portion 21 so that its top is between the legs 30 and 31. The trough 33 slopes in a direction complemental to the slope of the straight wall 27 and is fixedly secured to the legs 30 and 31.

The base 29 has side members 34 and 35 and a front member 36 connecting the forward ends of the side members 34 and 35 together. An upright leg 37 is secured to the base 29 at the junction of the other ends of the side members 34 and 35 and has its upper end connected to the upper ends of the legs 30 and 31 where they curve toward each other and are integrally formed. The upper end portions of the legs 30 and 31 are curved toward the leg 37 as at 38. The lower ends of each of the legs 30, 31, and 37 are provided with resilient cups so that the vase of the present invention may be mounted upon a surface without danger of marring the same. The cups are designated by the numeral 39.

In use, it will be seen that in each of the forms of the vase here illustrated and described, the roots of plants together with the soil surrounding the roots may be inserted within the receptacle and water and plant nutrients may be fed to the plants, the open top of each of the receptacles being relatively narrow so that there is little danger of spilling the contents therefrom. The stems and foliage of the plants may be arranged within the trough of each of the forms of the vase and may be supported therein in any floral arrangement desired.

The vase of the form of the invention shown in Figures 1 to 3, inclusive, may be fabricated of any suitable material such as plastic, ceramics, metal, china, pottery, or the like, and may be suitably colored or decorated in accordance with the color properties of the type of flowers or plants contained in the receptacle. The receptacle portion 21 of the second form of the vase as shown in Figures 4 to 6, inclusive, and 8 to 10, inclusive, may be similarly fabricated of like materials. The support of the form of the invention shown in Figures 7 to 10, inclusive, is preferably fabricated of a rigid wire or rods, or may be fabricated of plastic, either colored or translucent, so as to be relatively invisible when surrounded by and supporting the foliage of a plant.

This application is a continuation-in-part of application Serial Number 448,287 filed August 6, 1954, now abandoned.

What is claimed is:

1. A plant-supporting vase comprising a support including a horizontally-disposed base, and a pair of laterally-spaced legs rising from said base and sloping toward said base, a receptacle having an open top and including a flat bottom having spaced side edges and a front and a rear edge, a straight wall rising from the front edge of said bottom and sloping toward the rear edge of said bottom, and an apron rising from and extending about the rear edge and side edges of said bottom and secured to said straight wall, a mounting projection on the receptacle flat bottom, said receptacle being positioned upon said base so that the straight wall is between said legs and having its mounting projection received within said base, and a concavely-curved trough positioned above said receptacle so that its top is between said legs and slopes in a direction complemental to the slope of said receptacle straight wall, said trough being fixedly attached to said legs.

2. A plant-supporting vase comprising a support including a horizontally-disposed base, and a pair of laterally-spaced legs rising from said base and sloping toward said base, a receptacle having an open top and including a flat bottom having spaced side edges and a front and a rear edge, a straight wall rising from the front edge of said bottom and sloping toward the rear edge of said bottom, and an apron rising from and extending about the rear edge and side edges of said bottom and secured to said straight wall, said receptacle being positioned upon said base so that the straight wall is between said legs, and a concavely-curved trough positioned above said receptacle so that its top is between said legs and slopes in a direction complemental to the slope of said receptacle straight wall, said trough being fixedly attached to said legs.

References Cited in the file of this patent

UNITED STATES PATENTS

| | | |
|---|---|---|
| D. 102,332 | Manenty | Dec. 15, 1936 |
| 577,230 | Boyd | Feb. 16, 1897 |
| 1,013,662 | Kramer | Jan. 2, 1912 |
| 2,546,817 | Brunner | Mar. 27, 1951 |